United States Patent
Hayashi et al.

(10) Patent No.: US 7,696,839 B2
(45) Date of Patent: Apr. 13, 2010

(54) SIGNAL WAVEFORM EQUALIZER CIRCUIT AND RECEIVER CIRCUIT

(75) Inventors: Tetsuya Hayashi, Kawasaki (JP); Tomokazu Higuchi, Kawasaki (JP)

(73) Assignee: Fujitsu Microelectronics Limited, Yokohama (JP)

( * ) Notice: Subject to any disclaimer, the term of this patent is extended or adjusted under 35 U.S.C. 154(b) by 141 days.

(21) Appl. No.: 12/147,000

(22) Filed: Jun. 26, 2008

(65) Prior Publication Data
US 2009/0002076 A1    Jan. 1, 2009

(30) Foreign Application Priority Data
Jun. 27, 2007   (JP) .............................. 2007-168324

(51) Int. Cl.
*H04B 3/14* (2006.01)
*H03F 1/02* (2006.01)
(52) U.S. Cl. .................................... 333/28 R; 330/304

(58) Field of Classification Search ............... 333/28 R, 333/18; 375/229; 330/304
See application file for complete search history.

(56) References Cited

FOREIGN PATENT DOCUMENTS

| | | | |
|---|---|---|---|
| JP | 2001-102878 A | 4/2001 |
| JP | 2003-318726 A | 11/2003 |
| JP | 2005-260287 A | 9/2005 |

*Primary Examiner*—Stephen E Jones
(74) *Attorney, Agent, or Firm*—Arent Fox LLP

(57) ABSTRACT

A signal waveform equalizer circuit capable of equalizing the waveform of an input signal with a center voltage of 0 V and yet small in circuit scale. An input signal (in FIG. 1, positive-phase input signal) whose waveform is to be equalized is input to the source of an nMOS, and this enables the equalizer circuit to handle an input signal with the center voltage 0 V without the need to add an extra circuit. The waveform of the input signal is shaped by a delay circuit including a resistor and a capacitor, and an output signal (in FIG. 1, positive-phase output signal) is output from a node.

9 Claims, 13 Drawing Sheets

SIGNAL WAVEFORM EQUALIZER CIRCUIT AND RECEIVER CIRCUIT

CROSS-REFERENCE TO RELATED APPLICATIONS

This application is based upon and claims the benefits of priority from the prior Japanese Patent Application No. 2007-168324, filed on Jun. 27, 2007, the entire contents of which are incorporated herein by reference.

BACKGROUND

1. Field

The embodiment relates to signal waveform equalizer circuits and receiver circuits, which may relate to a signal waveform equalizer circuit for shaping signal waveforms distorted due to transmission, and a receiver circuit provided with the signal waveform equalizer circuit.

2. Description of the Related Art

In recent years, high-speed serial interfaces enabling over 1-Gbps data transfer between, for example, LSIs (Large Scale Integrated circuits), such as Serial-ATA (Advanced Technology Attachment), PCI (Peripheral Component Interconnect)-Express and 10 Gbit-Ethernet (registered trademark), have come into wide use.

Where a data signal is transmitted at high speed through a transmission line with large loss, however, the signal components, especially the high-frequency signal components are significantly lost, with the result that the waveform of the signal arriving at the receiver circuit is distorted, giving rise to a problem that the receiver circuit fails to properly receive the data. To solve the problem, a signal waveform equalizer circuit (equalizer circuit) has been used at the receiving end to amplify only the high-frequency components of the signal, thereby reproducing the original waveform.

FIG. 8 shows an example of a conventional equalizer circuit.

The conventional equalizer circuit 70 has pull-up resistors 71 and 72, n-channel MOSFETs (Metal Oxide Semiconductor Field Effect Transistors; hereinafter abbreviated as nMOS(s)) 73 and 74, a resistor 75, a capacitor 76, and constant current sources 77 and 78.

The pull-up resistor 71 is connected between a high potential-side power supply terminal VDD and the drain of the nMOS 73, and the pull-up resistor 72 is connected between the power supply terminal VDD and the drain of the nMOS 74. Differential signals are input to the equalizer circuit. Namely, a positive-phase input signal INP is input to the gate of the nMOS 73, and a negative-phase input signal INN is input to the gate of the nMOS 74. The resistor 75 and the capacitor 76 are connected in parallel between the sources of the nMOSs 73 and 74. Also, the source of the nMOS 73 is connected through the constant current source 77 to a low potential-side power supply terminal VSS, and the source of the nMOS 74 is connected through the constant current source 78 to the power supply terminal VSS. The potential between the drain of the nMOS 74 and the pull-up resistor 72 and the potential between the drain of the nMOS 73 and the pull-up resistor 71 are output as positive- and negative-phase output signals OUTP and OUTN, respectively, from the equalizer circuit 70.

FIG. 9 illustrates operating waveforms of the conventional equalizer circuit.

Specifically, the figure shows input data before transmission to the receiver circuit, data after the transmission (i.e., input signals (positive- and negative-phase input signals INP and INN) to the equalizer circuit 70), and output signals (positive- and negative-phase output signals OUTP and OUTN) of the equalizer circuit 70. In each graph, the horizontal and vertical axes indicate time T and voltage V, respectively.

As illustrated, the transmitted signals (positive- and negative-phase input signals INP and INN) are subject to loss because of the transmission over a transmission line, and their waveforms are distorted. For example, the difference in level between the positive- and negative-phase input signals INP and INN decreases, as shown in the figure.

Where the thus distorted positive- and negative-phase input signals INP and INN are input to the equalizer circuit 70 shown in FIG. 8, the high-frequency components of the signals are amplified by means of the circuit constant of the resistor 75 and capacitor 76, and positive- and negative-phase output signals OUTP and OUTN whose waveforms have been shaped (equalized), as shown in FIG. 9, are output.

In the conventional equalizer circuit 70 of FIG. 8, however, since the input signals (positive- and negative-phase input signals INP and INN) are applied to the gates of the nMOSs 73 and 74, the input signal voltages must at least be higher than a threshold at which the nMOSs 73 and 74 are switched on, in order to permit a sufficient current to flow. Accordingly, the equalizer circuit as it stands is unable to handle input signals with a center voltage of 0 V, as used in the PCI-Express standard.

Conventionally, therefore, the center voltage of the input signals had to be converted before input to the equalizer circuit 70.

FIG. 10 shows part of a receiver circuit including a center voltage converter circuit as a circuit preceding the equalizer circuit.

The center voltage converter circuit 80 has capacitors 81 and 82, and resistors 83 and 84. The positive- and negative-phase input signals INP and INN are input through the capacitors 81 and 82, respectively, to the equalizer circuit 70. The node between the capacitor 81 and the equalizer circuit 70 is connected to one end of the resistor 83, and the node between the capacitor 82 and the equalizer circuit 70 is connected to one end of the resistor 84. A bias voltage is applied to the other ends of the resistors 83 and 84. Because of the capacitive coupling, the center voltage 0 V of the positive- and negative-phase input signals INP and INN can be converted to the bias voltage.

Where the center voltage converter circuit 80 is used to pull up the center voltage, however, the problem described below arises.

FIG. 11 shows the manner of how the center voltage converter circuit outputs signals by pulling up their center voltage, wherein the horizontal and vertical axes indicate time T and voltage V, respectively. The figure also shows the input signals (positive- and negative-phase input signals INP and INN) whose center voltage is not pulled up yet, namely, the input signals with the center voltage 0 V.

As seen from FIG. 11, where the center voltage is pulled up by means of capacitive coupling, the amplitudes of the positive- and negative-phase input signals INP and INN decrease with the lapse of time if the input data and thus the input signal voltages remain the same, with the result that the voltage difference between the differential input signals diminishes, making it difficult to receive the data.

Also, if the frequency of occurrences "1" and "0" in the input data is biased toward "1" or "0", the signal amplitudes become imbalanced, making it hard to receive either of the input data. Accordingly, restrictions need to be imposed on the use (or the specification) such that "1" and "0" of data should occur with an equal probability during a fixed period of time.

In the conventional receiver circuit, the equalizer circuit 70 is followed by a data latch circuit for receiving and latching the positive- and negative-phase output signals OUTP and OUTN (see, e.g., Unexamined Japanese Patent Publication No. 2003-318726).

FIG. 12 shows an exemplary configuration of the data latch circuit.

The data latch circuit 90 has p-channel MOSFETs (hereinafter abbreviated as pMOS(s)) 91 to 94, and nMOSs 95 to 99.

The pMOSs 91 and 92 have their sources connected to the power supply terminal VDD, and their drains connected to each other as well as to the gates of the pMOS 93 and nMOS 96 and the drain of the nMOS 95. A clock signal CK is input to the gate of the pMOS 91.

The pMOSs 93 and 94 have their sources connected to the power supply terminal VDD, and their drains connected to each other as well as to the gates of the pMOS 92 and nMOS 95 and the drain of the nMOS 96. The clock signal CK is input to the gate of the pMOS 94.

The sources of the nMOSs 97 and 98 are connected to each other as well as to the drain of the nMOS 99. Out of the output signals of the equalizer circuit 70, the positive-phase output signal OUTP is input to the gate of the nMOS 97, and the negative-phase output signal OUTN is input to the gate of the nMOS 98.

The nMOS 99 has its source connected to the power supply terminal VSS, and its gate input with the clock signal CK.

The data latch circuit 90 outputs positive- and negative-phase latch output signals, of which the positive-phase latch output signal LATOP is derived from the node between the drain of the nMOS 96 and the drains of the pMOSs 93 and 94, while the negative-phase latch output signal LATON is derived from the node between the drain of the nMOS 95 and the drains of the pMOSs 91 and 92.

In the data latch circuit 90 configured as above, the output signals (positive- and negative-phase output signals OUTP and OUTN) of the equalizer circuit 70 are input to the gates of the nMOSs 97 and 98, and when the clock signal CK rises, the input data is held by a latch constituted by the pMOSs 92 and 93 and the nMOSs 95 and 96.

In order for the data to be correctly latched, however, the voltage level of either of the positive- and negative-phase output signals OUTP and OUTN must at least be higher than a threshold at which the nMOSs 97 and 98 of the data latch circuit 90 are switched on. Thus, the circuit constant of the equalizer circuit 70 needs to be tuned so that the above voltage level can be secured in all processing and operating conditions.

Such tuning of the circuit constant, however, restricts the operating range (operable bandwidth) of the equalizer circuit 70, giving rise to a problem that the required characteristics cannot be obtained.

In the conventional equalizer circuit 70, for example, if the resistances of the pull-up resistors 71 and 72 are high because of variations caused during the manufacture or due to temperature fluctuation, the voltages of the positive- and negative-phase output signals OUTP and OUTN lower. Thus, taking account of such situations, the circuit constant is tuned through simulation so that the output voltage levels of the equalizer circuit 70 may be high enough to enable the data latch circuit 90 to hold data.

Conversely, if the resistances of the pull-up resistors are low, then the voltages of the positive- and negative-phase output signals OUTP and OUTN become too high, so that the differential voltage swing becomes small or the voltage for discriminating the data held by the data latch circuit 90 deviates from an appropriate level enabling high-sensitivity decision, deteriorating the characteristics as a whole.

To solve the problem, there have been proposed methods in which the equalizer circuit 70 is followed by a differential amplifier circuit or is additionally provided with a feedback circuit.

FIG. 13 shows part of a receiver circuit in which the conventional equalizer circuit is additionally provided with a feedback circuit.

In the figure, like reference signs are used to denote like elements of the equalizer circuit 70 shown in FIG. 8. The feedback circuit 100 has a comparator 101 and resistors 102 and 103. As illustrated, the center voltage of the positive- and negative-phase output signals OUTP and OUTN is obtained by means of resistance splitting. The center voltage is input to the positive-phase input terminal of the comparator 101, and a reference voltage is input to the negative-phase input terminal of same. In accordance with the result of the comparison between the center voltage and the reference voltage, the resistances of pull-up resistors 71a and 72a, which are variable resistors as illustrated, are adjusted so that the output signals may have appropriate voltage levels.

The addition of the feedback circuit 100, however, leads to complexity of circuitry as well as to increase in area and current consumption.

Meanwhile, Unexamined Japanese Patent Publication No. 2005-260287, for example, discloses an amplifier which is provided with an input voltage monitor circuit and in which, when the center voltage (common voltage) of the input signal varies, the gate voltage of a MOS is controlled to prevent the gain from becoming unstable.

As explained above, to enable the conventional equalizer circuit to handle input signals with the center voltage 0 V, as used in the PCI-Express standard, an extra circuit needs to be additionally provided and also restrictions must be placed on the input signals. Also, the conventional receiver circuit involves significant labor in tuning the circuit constant by means of simulation in order to allow the data latch circuit succeeding the equalizer circuit to hold data. Further, since a feedback circuit or a differential amplifier circuit needs to be additionally provided, a problem arises in that the scale of circuitry enlarges.

SUMMARY

It is an aspect of the embodiments discussed herein to provide a signal waveform equalizer circuit including: an n-channel MOS field effect transistor for amplifying an input signal whose waveform is to be equalized, the input signal being input to a source of the MOS field effect transistor; a delay circuit having a resistor connected between a drain and gate of the MOS field effect transistor and a capacitor having one terminal connected to a first node between the resistor and the gate of the MOS field effect transistor; and a current setter connected to the drain of the MOS field effect transistor, for setting a drain-source current, wherein a potential at a second node between the current setter and the resistor is output as an output signal.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE EMBODIMENTS

Figure 1:
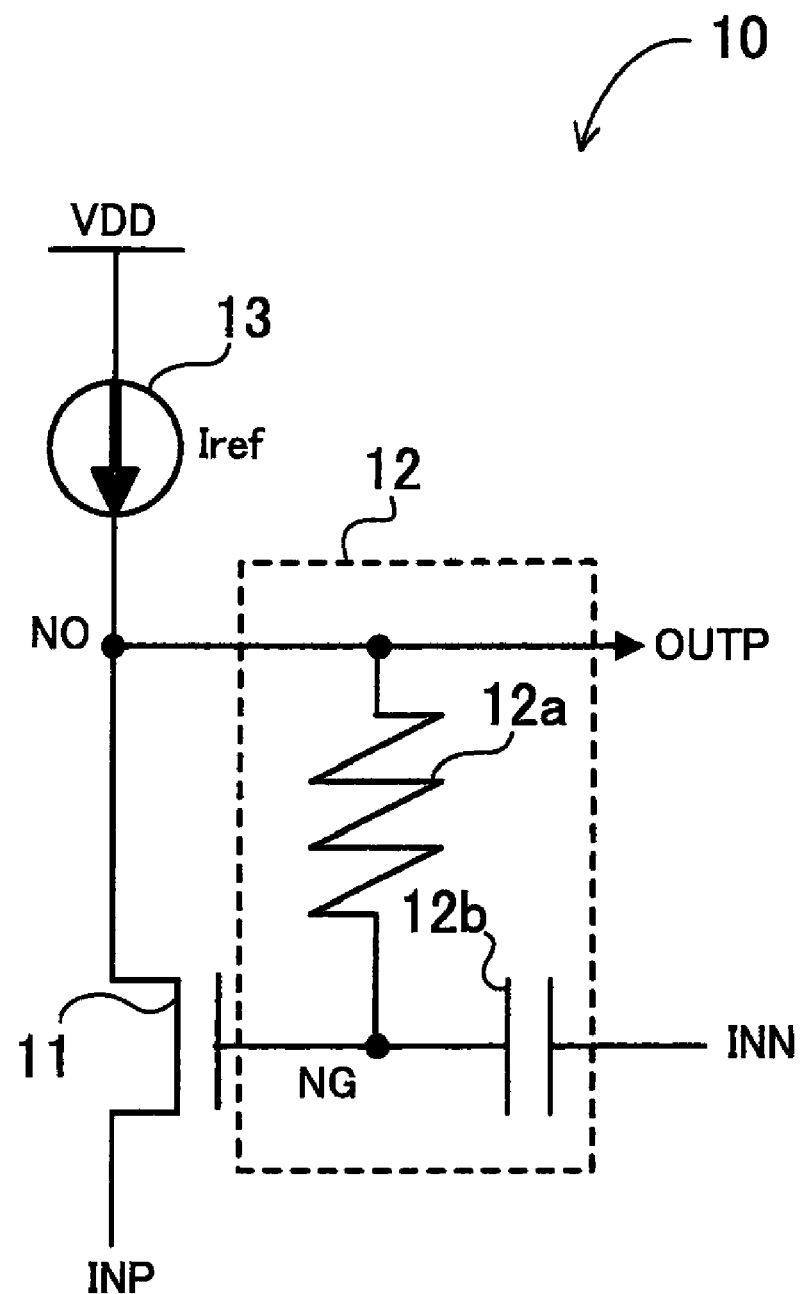
FIG. 1 shows the configuration of an equalizer circuit according to a first embodiment.

Embodiments will be described in detail below with reference to the accompanying drawings, wherein like reference numerals refer to like elements throughout.

FIG. 1 shows the configuration of an equalizer circuit according to a first embodiment.

The illustrated equalizer circuit 10 shapes the waveform of one (positive-phase input signal INP) of differential signals.

The equalizer circuit 10 of the first embodiment has an nMOS 11 for signal amplification, a delay circuit 12, and a constant current source 13.

The positive-phase input signal INP is input to the source of the nMOS 11.

The delay circuit 12 includes a resistor 12a and a capacitor 12b. The resistor 12a is connected between the gate and drain of the nMOS 11. The capacitor 12b has one terminal connected to a node NG between the resistor 12a and the gate and the other terminal input with a negative-phase input signal INN.

The constant current source 13 is connected to the drain of the nMOS 11 and is adapted to set the drain-source current. Specifically, the constant current source is applied with a power supply voltage (hereinafter referred to as power supply voltage VDD) from a power supply terminal VDD and generates a constant current Iref. The constant current source 13 is configured using, for example, a MOSFET.

The output signal (positive-phase output signal OUTP) of the equalizer circuit 10 is derived from a node NO between the constant current source 13 and the resistor 12a and is output.

Although not shown, an equalizer circuit for shaping the waveform of the other (negative-phase input signal INN) of the differential signals has a configuration identical with that shown in FIG. 1. The negative-phase input signal INN, instead of the positive-phase input signal INP, is input to the source of the nMOS 11, and the positive-phase input signal INP, instead of the negative-phase input signal INN, is input to the other terminal of the capacitor 12b.

Operation of the equalizer circuit 10 of FIG. 1 will be now described.

Figure 2:
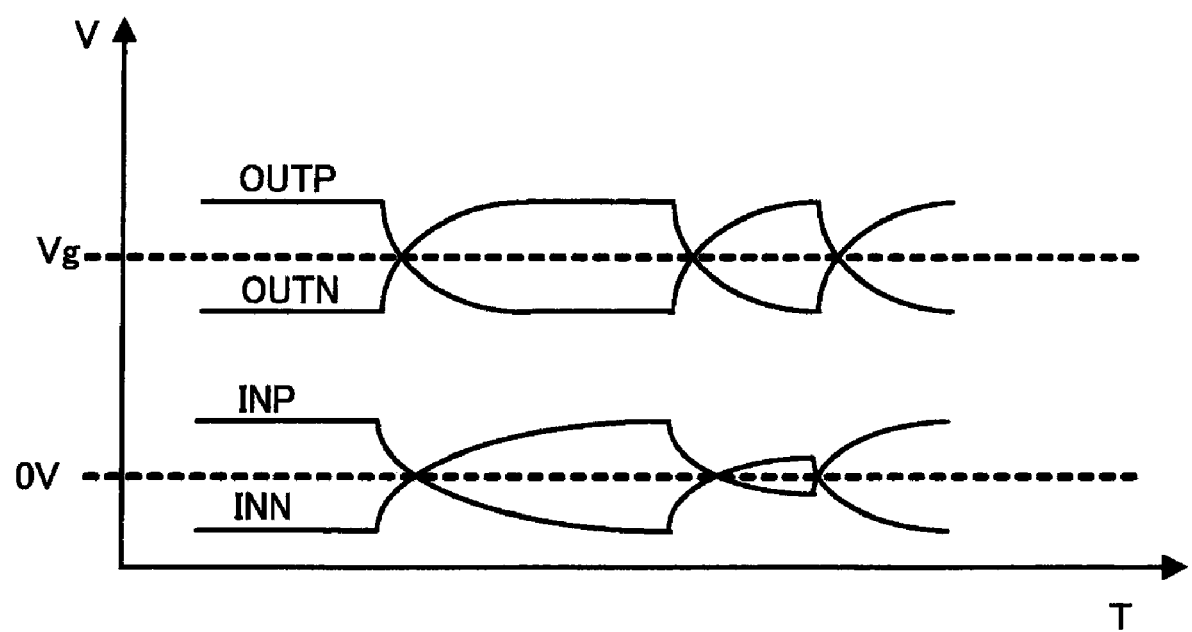
FIG. 2 shows operating waveforms of the equalizer circuit.

FIG. 2 illustrates operating waveforms of the equalizer circuit, wherein the horizontal and vertical axes indicate time T and voltage V, respectively.

The figure shows the manner of how the waveforms of both the positive- and negative-phase input signals INP and INN are shaped.

Where the positive-phase input signal INP with the center voltage 0 V is at a low frequency, the potentials at the nodes NG and NO are equal, and the gate voltage Vg of the nMOS 11 remains at a level at which the constant current Iref flows between the drain and the source at all times. At this time, the equalizer circuit 10 functions as a voltage shifting circuit, so that the positive-phase output signal OUTP takes on a waveform shifted from the positive-phase input signal INP by an amount corresponding to the gate voltage Vg.

On the other hand, where the positive-phase input signal INP is at a high frequency wherein the signal level turns to "1" or "0", the voltage transition of the node NG is lagged behind the positive-phase input signal INP by the resistor 12a and the capacitor 12b constituting the delay circuit 12, so that the voltage of the positive-phase input signal INP is amplified to provide the positive-phase output signal OUTP. Consequently, the distorted waveform of the positive-phase input signal INP is shaped as shown in FIG. 2. Namely, the circuit functions as an equalizer.

The time constant determined by the resistor 12a and the capacitor 12b may be adjusted in accordance with the amount of distortion of the positive-phase input signal INP caused on the transmission line, thereby to vary the strength of waveform shaping.

Instead of the positive-phase input signal INP, the negative-phase input signal INN is input to the other equalizer circuit identical with that shown in FIG. 1, whereby the waveform of the negative-phase input signal is shaped as shown in FIG. 2.

Figure 10:
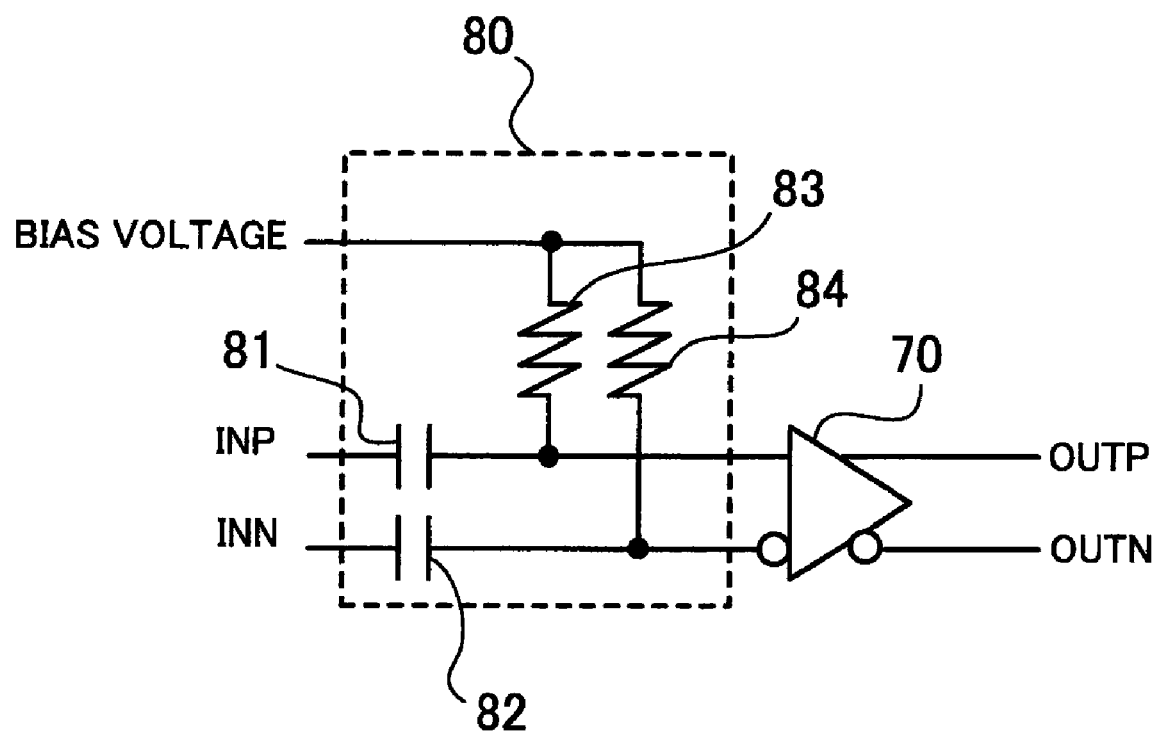
FIG. 10 shows part of a receiver circuit including a center voltage converter circuit as a circuit preceding the equalizer circuit.
Figure 11:
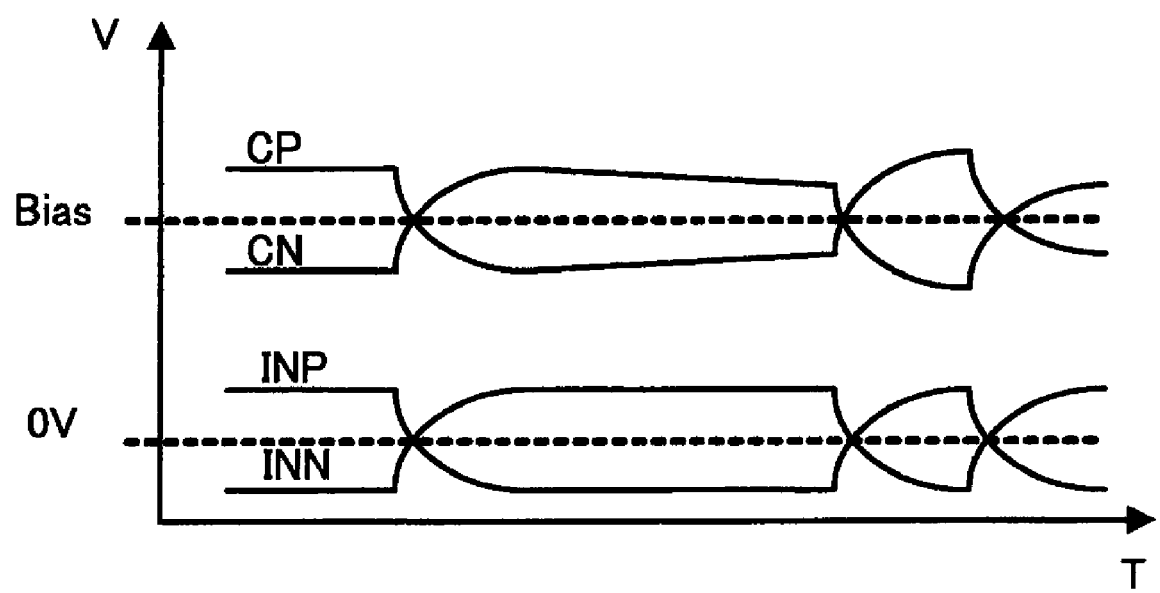
FIG. 11 shows the manner of how the center voltage converter circuit outputs signals by pulling up a center voltage.

Thus, in the equalizer circuit 10 of the first embodiment, the positive-phase input signal INP with the center voltage 0 V is input to the source of the nMOS 11, and it is therefore unnecessary to use a capacitive coupling-type center voltage converter circuit, such as the one shown in FIG. 10. Consequently, no restriction is imposed on the input signal and the scale of the circuit can be significantly reduced.

Also, nMOS generally responds faster to its source input than to its gate input, and accordingly, signals input at higher data rates can be handled. Even with respect to input signals of the same data rate, greater output amplitude can be obtained; therefore, it is easier for the succeeding data latch circuit, shown in FIG. 12, to receive data. It is therefore unnecessary to connect a differential amplifier circuit subsequently to the equalizer circuit.

Further, the required constant current Iref is relatively small, and accordingly, the current consumption can be made smaller than with the conventional equalizer circuit.

Figure 12:
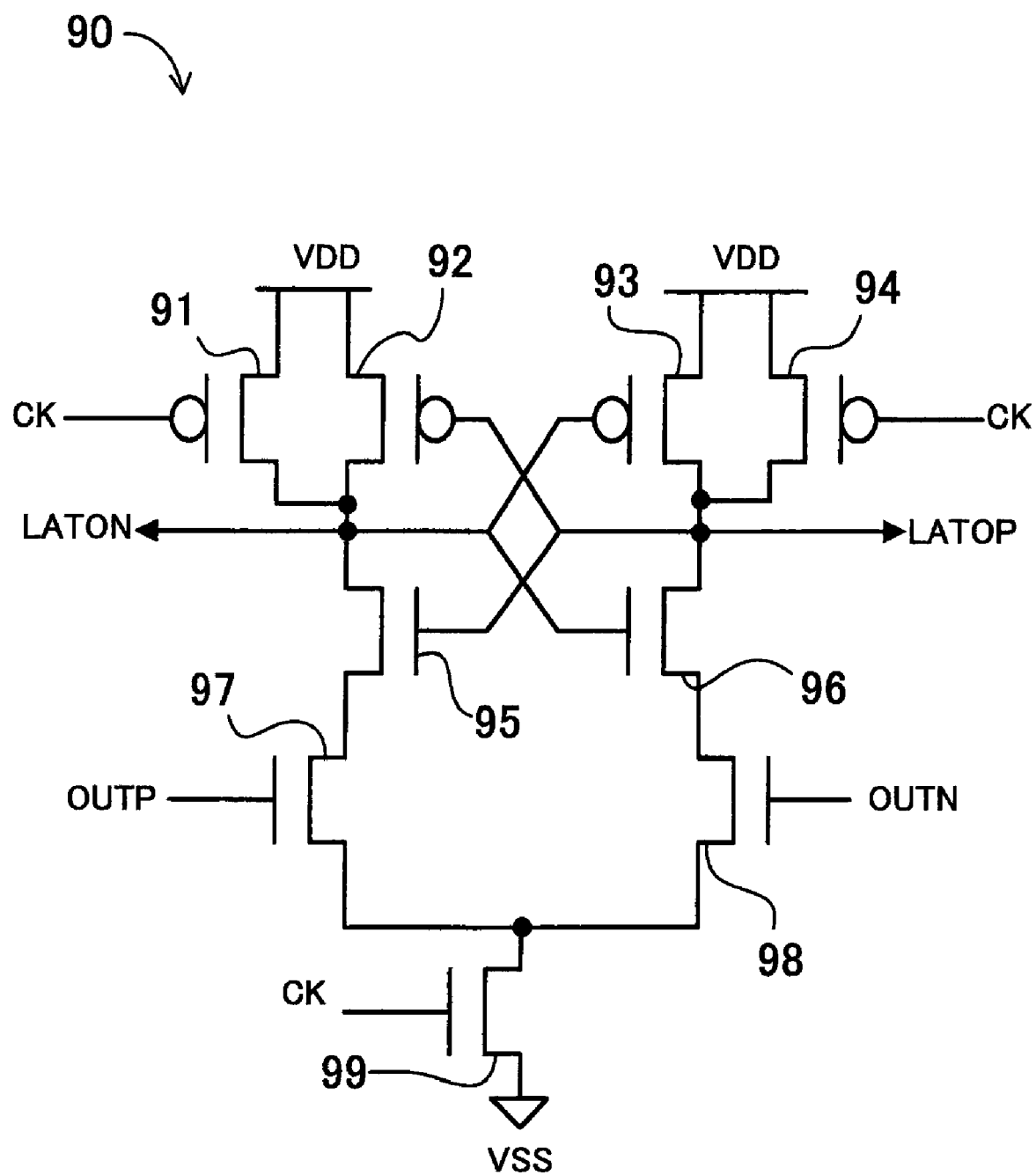
FIG. 12 shows an exemplary configuration of a data latch circuit.
Figure 13:
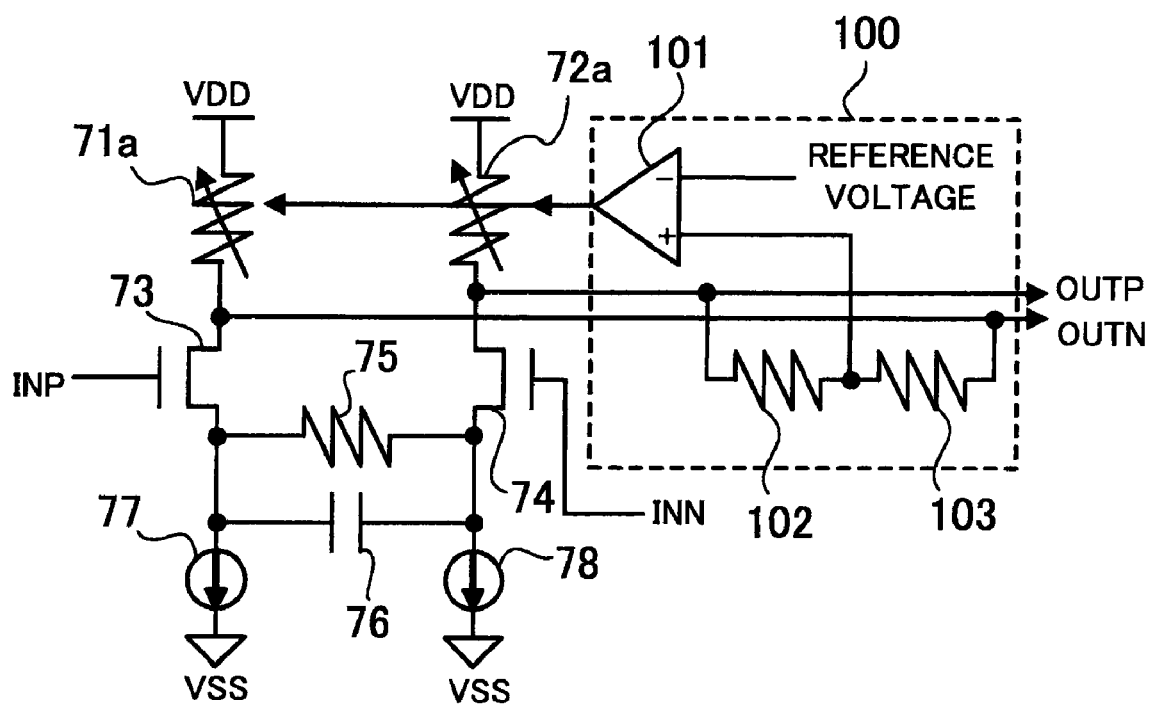
FIG. 13 shows part of a receiver circuit in which the conventional equalizer circuit is additionally provided with a feedback circuit.

Moreover, the equalizer circuit constitutes a current mirror circuit in cooperation with the input-stage circuit of the data latch circuit shown in FIG. 12, whereby the circuit constant can be tuned with ease.

Figure 3:
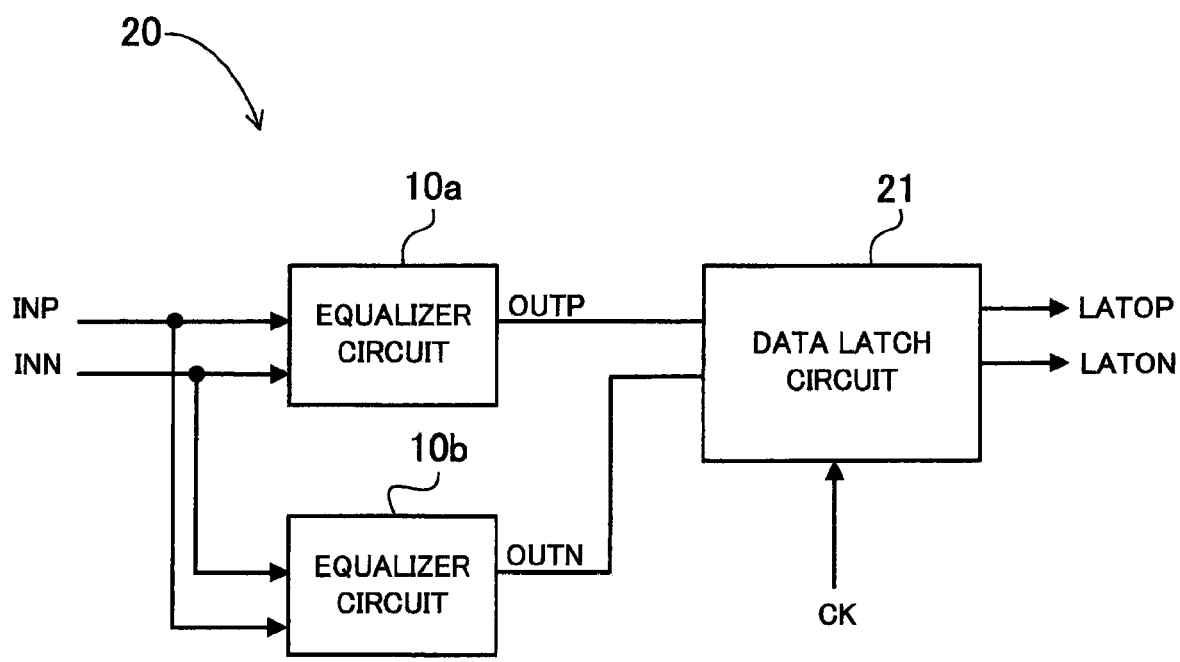
FIG. 3 schematically shows the configuration of a receiver circuit.

FIG. 3 shows a schematic configuration of a receiver circuit.

The receiver circuit 20 is input with differential signals, of which the positive-phase input signal INP is subjected to waveform shaping by an equalizer circuit 10a and the negative-phase input signal INN is subjected to waveform shaping by an equalizer circuit 10b. The equalizer circuits 10a and 10b each have the same configuration as shown in FIG. 1. A data latch circuit 21 is input with positive- and negative-phase output signals OUTP and OUTN from the respective equalizer circuits 10a and 10b, latches the input signals in synchronism with a clock signal CK applied thereto, and then outputs positive- and negative-phase latch output signals LATOP and LATON.

A detailed configuration of the data latch circuit 21 is identical with that shown in FIG. 12. In the receiver circuit 20, the input-stage circuit of the data latch circuit input with the positive- and negative-phase output signals OUTP and OUTN from the equalizer circuits 10a and 10b constitutes a current mirror circuit in cooperation with the individual equalizer circuits 10a and 10b. Specifically, the nMOSs of the data latch circuit 21 (in FIG. 12, nMOSs 97 and 98) are individually applied with a gate voltage such that their drain-source current is identical with the constant current Iref flowing to the nMOS (in FIG. 1, nMOS 11) of the equalizer circuit 10a, 10b.

Accordingly, the constant current Iref has only to be set taking account of a current that should desirably be passed through the nMOSs of the data latch circuit 21, whereby a voltage level at which the data latch circuit 21 can latch data can be set. This makes it possible to lessen the labor required during simulation for determining the circuit constant.

Figure 4:
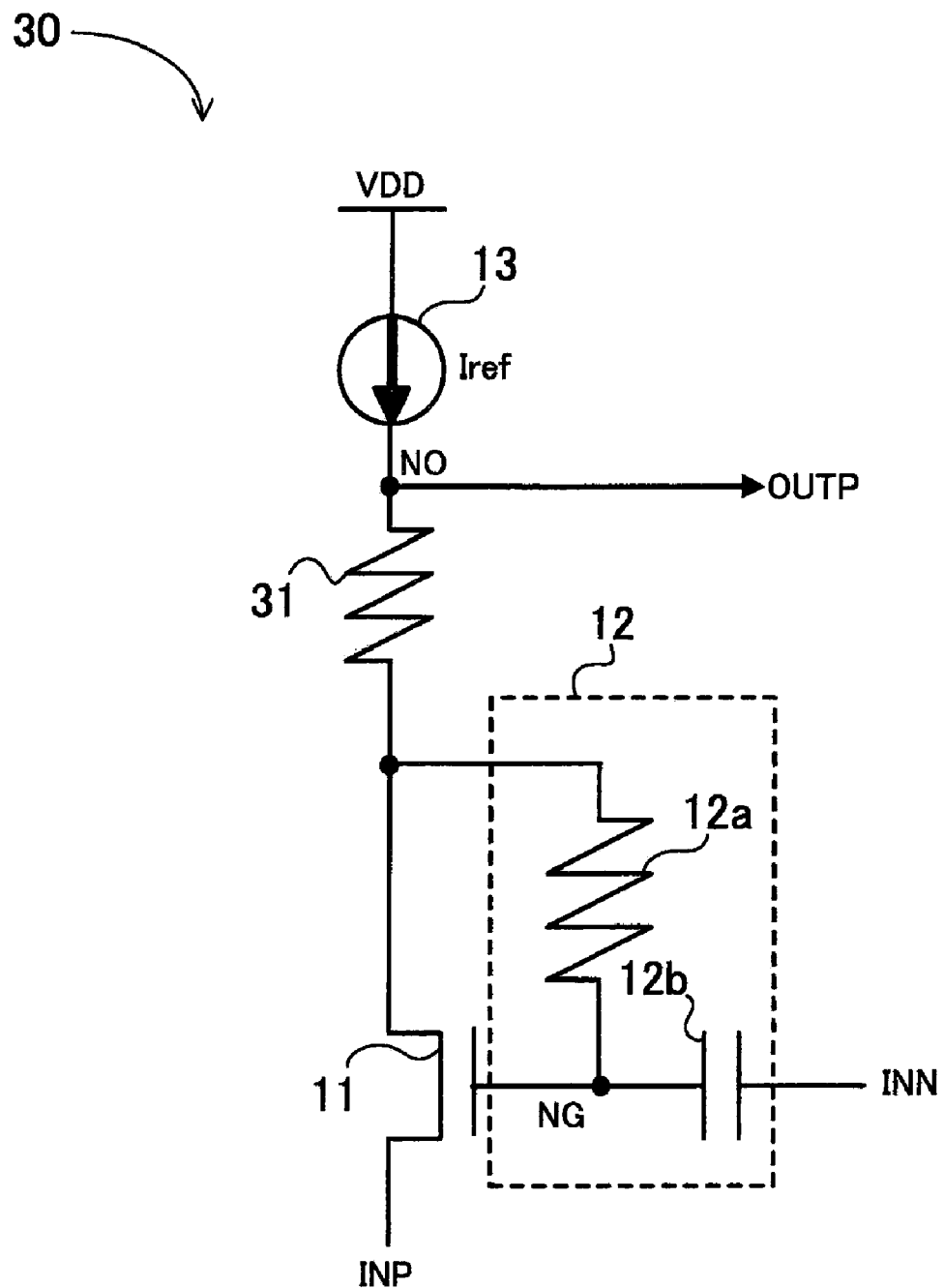
FIG. 4 shows the configuration of an equalizer circuit according to a second embodiment.

FIG. 4 shows the configuration of an equalizer circuit according to a second embodiment.

The illustrated equalizer circuit 30 shapes the waveform of one (positive-phase input signal INP) of differential signals, and also, like reference signs denote like elements appearing in FIG. 1.

The equalizer circuit 30 of the second embodiment differs from the equalizer circuit 10 of the first embodiment in that a resistor 31 is connected between the node NO, from which the positive-phase output signal OUTP is derived, and the drain of the nMOS 11.

The resistor 31 is inserted in the equalizer circuit 30 to ensure that current flows through the corresponding nMOS of the data latch circuit in case the center voltage of the positive-phase input signal INP drops below 0 V due to noise or the like. The resistance of the resistor 31 and the constant current Iref may be adjusted taking account of an expected amount of noise.

Consequently, the voltage of the positive-phase output signal OUTP rises by an amount corresponding to the product of the values of the resistor 31 and constant current Iref, so that an output waveform compensating for the influence of noise can be obtained.

The above equalizer circuit 30 can be made to output the negative-phase output signal by reversing the positive- and negative-phase input signals INP and INN, and in this case, the equalizer circuit outputs a signal having a waveform similarly compensating for the influence of noise contained in the negative-phase input signal INN.

Figure 5:
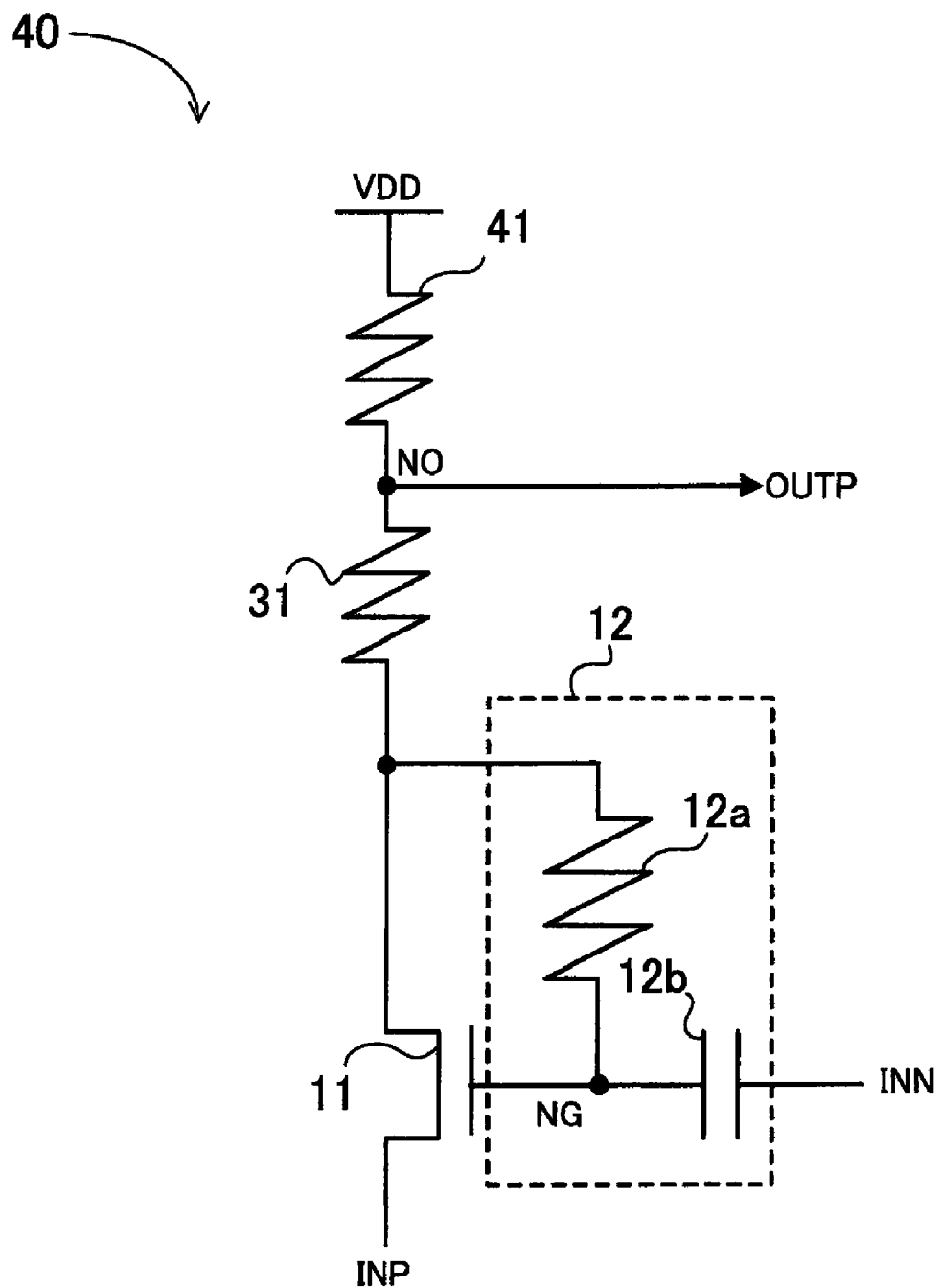
FIG. 5 shows the configuration of an equalizer circuit according to a third embodiment.

FIG. 5 shows the configuration of an equalizer circuit according to a third embodiment. In the figure, identical reference signs are used to denote elements identical with those of the equalizer circuit 30 of the second embodiment.

The equalizer circuit 40 of the third embodiment differs from the equalizer circuits 10 and 30 of the first and second embodiments in that a resistor 41 is used in place of the constant current source 13.

In the equalizer circuits 10 and 30 of the first and second embodiments in which the constant current source 13 is used for setting the drain-source current, the voltage swing of the positive-phase output signal OUTP is equal to that of the positive-phase input signal INP, and the characteristic obtained is most suitable for an equalizer. Usually, however, the current source is constituted by a MOSFET whose gate is applied with a constant voltage, and in this case, there is an upper limit on the voltage that can be used in the current source.

Figure 6A:
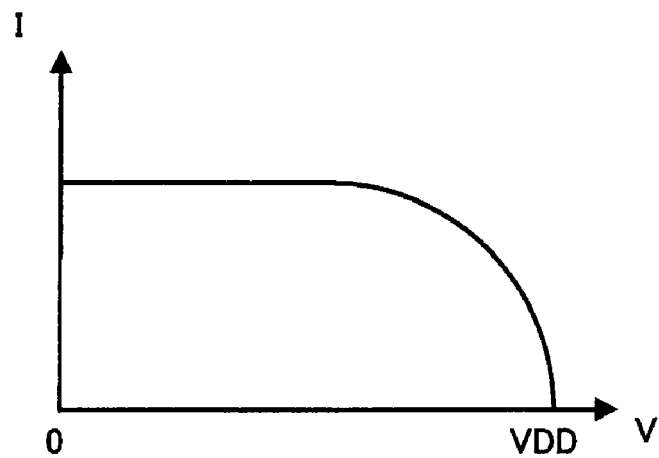
FIGS. 6A and 6B are graphs showing the relationship between the voltage and current of a positive-phase output signal OUTP.
Figure 6B:
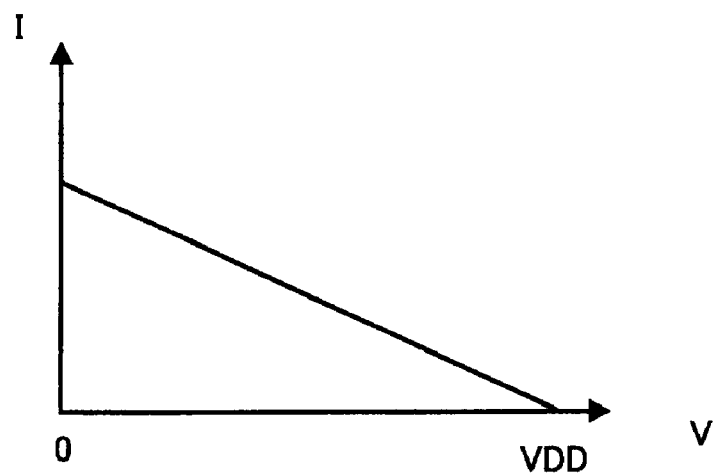

FIGS. 6A and 6B are graphs showing the relationship between the voltage and current of the positive-phase output signal OUTP, wherein FIG. 6A shows the case where a current source load comprising a MOSFET is used, and FIG. 6B shows the case where a resistive load is used. In both graphs, the horizontal axis indicates the voltage V of the positive-phase output signal OUTP and the vertical axis indicates the output current I.

Where a current source is used as in the case of FIG. 6A, as the voltage V of the positive-phase output signal OUTP approaches the power supply voltage VDD past the upper limit, the voltage dependence of the output current I becomes nonlinear, causing distortion of the output waveform. Consequently, when the power supply voltage is low or when the center voltage of the positive-phase input signal INP rises due to noise or the like, the equalizer characteristic is liable to deteriorate.

On the other hand, where the resistor 41 connected to the power supply terminal VDD is used as the load, the output current I shows a characteristic such that the current I linearly decreases to "0" with increase in voltage to the power supply voltage VDD. It is therefore possible to prevent distortion of the waveform over the entire range of the voltage V.

In the above equalizer circuit 40, the resistor 31 may be omitted, like the first embodiment.

The equalizer circuit 40 can be made to output the negative-phase output signal by reversing the positive- and negative-phase input signals INP and INN, and in this case, waveform distortion can be prevented even if the voltage of the negative-phase output signal OUTN varies over a wide range.

In the equalizer circuits 10, 30 and 40 of the first to third embodiments, the negative-phase input signal INN is input to one terminal of the capacitor 12b of the delay circuit 12. Alternatively, that terminal of the capacitor may be fixed at a constant voltage such as GND (ground potential). In this case, although the required capacitance (i.e., required capacitive area) of the capacitor 12b doubles, the parasitic capacitance attributable to the negative-phase input signal INN lessens.

Also, the time constant of the delay circuit 12 may be variably controlled by a control signal.

Figure 7:
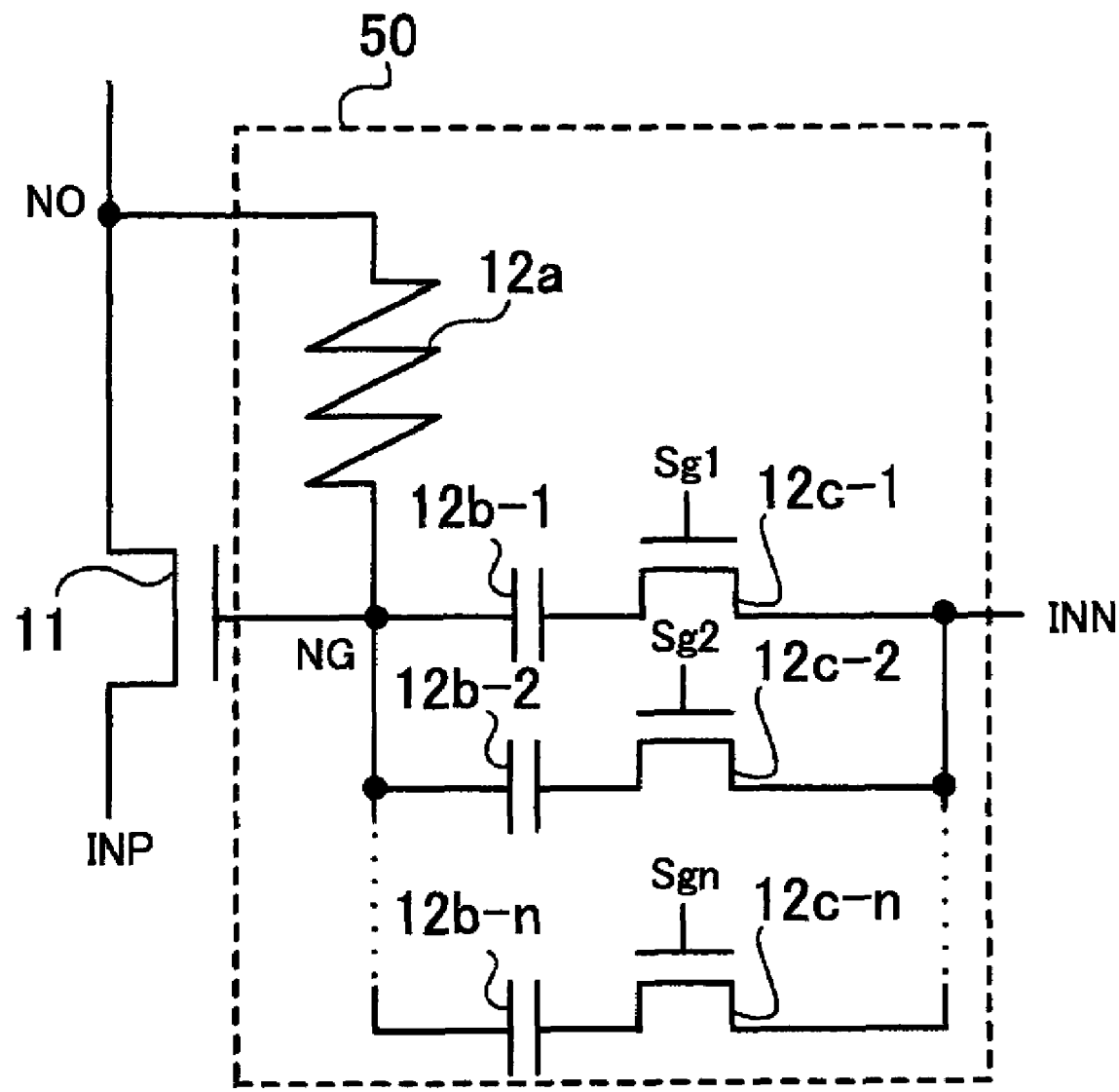
FIG. 7 shows an exemplary configuration of a delay circuit whose time constant is variable.
Figure 8:
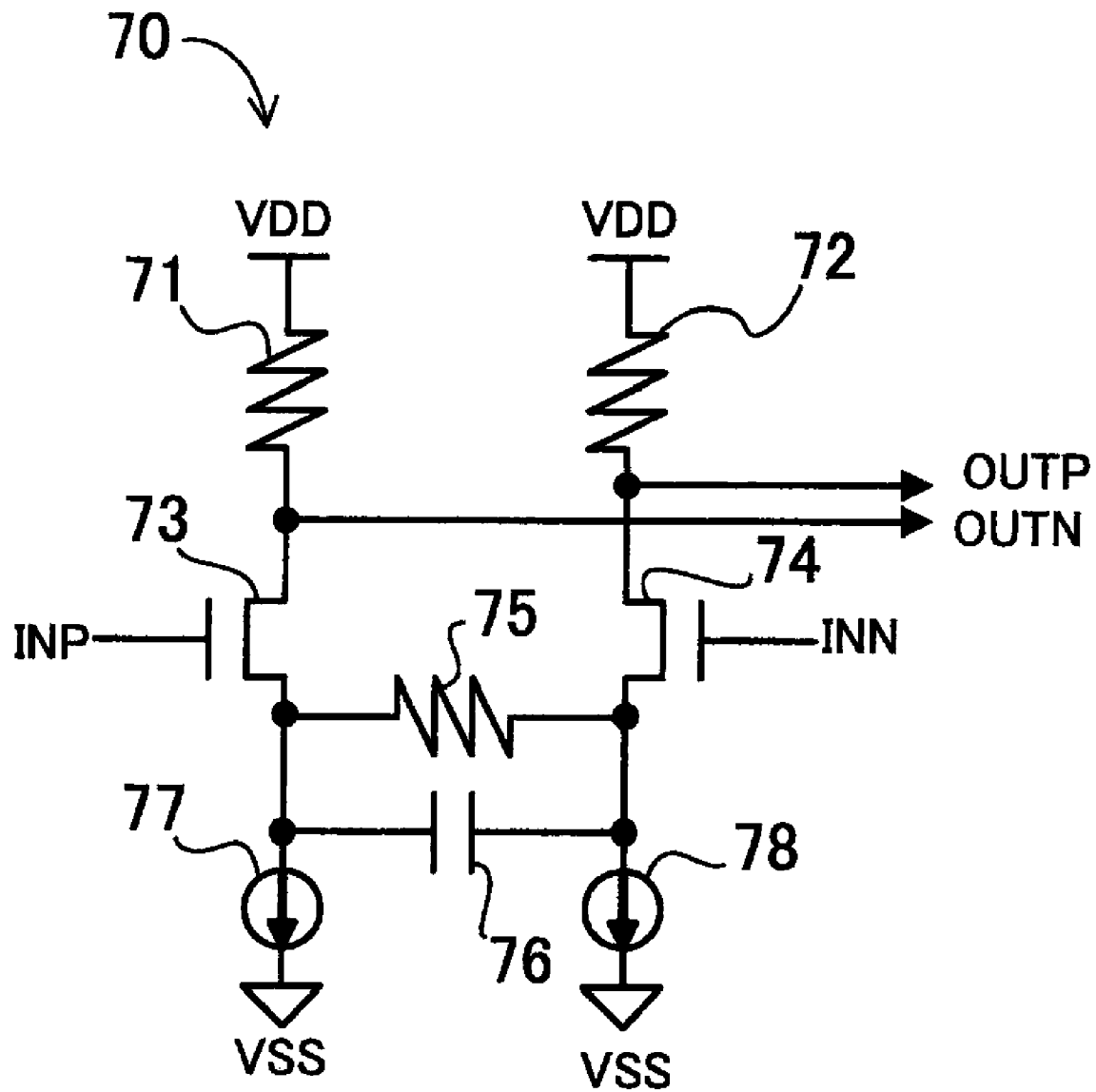
FIG. 8 shows an example of a conventional equalizer circuit.
Figure 9:
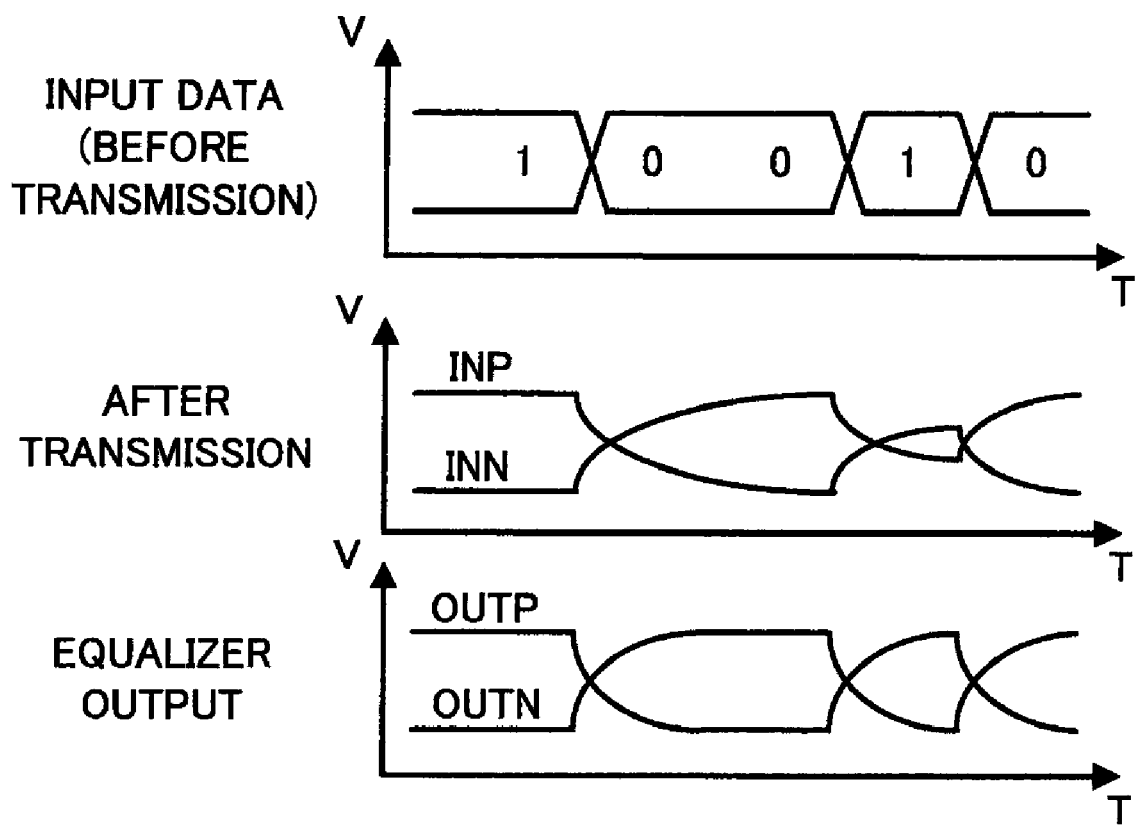
FIG. 9 shows operating waveforms of the conventional equalizer circuit.

FIG. 7 shows an exemplary configuration of a delay circuit of which the time constant is variable. In the figure, identical reference signs are used to denote elements identical with those in the delay circuit 12 of the equalizer circuit 10 of the first embodiment.

As distinct from the delay circuit 12 in FIG. 1, the delay circuit 50 has parallel-connected capacitors 12b-1, 12b-2, . . . , 12b-n connected to the node NG, and switching nMOSs 12c-1, 12c-2, . . . , 12c-n connected in series with the respective capacitors. The other terminals of the nMOSs 12c-1 to 12c-n are connected together and input with the negative-phase input signal INN (or connected to GND).

In the delay circuit 50 configured as above, switching of the nMOSs 12c-1 to 12c-n is controlled by control signals Sg1, Sg2, . . . , Sgn input to the respective gates, whereby the number of active capacitors, namely, the time constant, can be varied.

While the first to third embodiments have been described, it is to be noted that an invention is not limited to the foregoing embodiments alone.

In the waveform equalizer circuit, the input signal with the center voltage 0 V is input to the source of the n-channel MOS field effect transistor, and accordingly, a distorted waveform of the input signal can be shaped without the need to add an extra circuit. It is therefore unnecessary to use a capacitive coupling-type center voltage converter circuit, thus removing restrictions on the input signal and making it possible to reduce the scale of circuitry.

Also, the waveform equalizer circuit constitutes a current mirror circuit in cooperation with the input-stage circuit of the data latch circuit succeeding the waveform equalizer circuit. Thus, the current setting may be made by the current setter solely taking account of a current that should desirably be passed through the input-stage circuit of the data latch circuit, whereby a voltage level at which the data latch circuit can accurately latch data can be set. This facilitates the tuning of the circuit constant, and also since it is unnecessary to additionally provide a feedback circuit, differential amplifier circuit or the like, the scale of circuitry can be reduced.

The foregoing is considered as illustrative only of the principles of the embodiment. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A signal waveform equalizer circuit comprising:
    an n-channel MOS field effect transistor for amplifying an input signal whose waveform is to be equalized, the input signal being input to a source of the MOS field effect transistor;
    a delay circuit having a resistor connected between a drain and gate of the MOS field effect transistor and a capacitor having one terminal connected to a first node between the resistor and the gate of the MOS field effect transistor; and
    a current setter connected to the drain of the MOS field effect transistor, for setting a drain-source current,
    wherein a potential at a second node between the current setter and the resistor is output as an output signal.

2. The signal waveform equalizer circuit according to claim 1, wherein the input signal is one of differential signals, the other of the differential signals being input to the other terminal of the capacitor.

3. The signal waveform equalizer circuit according to claim 1, wherein the other terminal of the capacitor is connected to a ground potential.

4. The signal waveform equalizer circuit according to claim 1, further comprising a resistor connected between the second node and the drain of the MOS field effect transistor.

5. The signal waveform equalizer circuit according to claim 1, wherein the current setter is a constant current source.

6. The signal waveform equalizer circuit according to claim 1, wherein the current setter is a resistor having one end input with a power supply voltage.

7. The signal waveform equalizer circuit according to claim 1, wherein the delay circuit has a time constant variable in accordance with a control signal.

8. A receiver circuit for receiving an input signal through a transmission line, comprising:
    a signal waveform equalizer circuit including an n-channel MOS field effect transistor for amplifying the input signal whose waveform is to be equalized, the input signal being input to a source of the MOS field effect transistor, a delay circuit having a resistor connected between a drain and gate of the MOS field effect transistor and a capacitor having one terminal connected to a first node between the resistor and the gate of the MOS field effect transistor, and a current setter connected to the drain of the MOS field effect transistor, for setting a drain-source current, wherein a potential at a second node between the current setter and the resistor is output as an output signal; and
    a data latch circuit for holding the output signal, the data latch circuit including an input-stage circuit to which the output signal is input and which constitutes a current mirror circuit in cooperation with the signal waveform equalizer circuit.

9. The receiver circuit according to claim 8, wherein the input signal comprises positive- and negative-phase input signals, the signal waveform equalizer circuit includes two circuits, one for equalizing waveform of the positive-phase input signal and the other for equalizing waveform of the negative-phase input signal, and the data latch circuit holds the output signals output from the two signal waveform equalizer circuits.

* * * * *